United States Patent [19]
Faruque

[11] Patent Number: 5,850,608
[45] Date of Patent: Dec. 15, 1998

[54] DIRECTIONAL FREQUENCY ASSIGNMENT IN A CELLULAR RADIO SYSTEM

[75] Inventor: Saleh Faruque, Plano, Tex.

[73] Assignee: Nothern Telecom Limited, Montreal, Canada

[21] Appl. No.: 745,390

[22] Filed: Nov. 8, 1996

[51] Int. Cl.⁶ .................................................. H04Q 7/02
[52] U.S. Cl. .......................................... 455/447; 455/446
[58] Field of Search ................................... 455/447, 446, 455/448, 450, 464, 509, 62

[56] References Cited

U.S. PATENT DOCUMENTS

| | | | |
|---|---|---|---|
| 4,075,429 | 2/1978 | Takahata et al. | 179/15 BM |
| 5,073,971 | 12/1991 | Schaeffer | 455/447 |
| 5,093,925 | 3/1992 | Chanroo | 455/447 |
| 5,183,667 | 2/1993 | Faruque . | |
| 5,365,571 | 11/1994 | Rha et al. | 455/446 |
| 5,459,759 | 10/1995 | Schilling | 455/447 |
| 5,535,215 | 7/1996 | Hieatt, III | 455/446 |
| 5,633,915 | 5/1997 | Yang et al. | 379/60 |
| 5,649,292 | 7/1997 | Doner | 455/447 |

*Primary Examiner*—Nguyen Vo
*Assistant Examiner*—Edan Orgad
*Attorney, Agent, or Firm*—Kenneth W. Bolvin

[57] ABSTRACT

The process of the present invention is based on a hexagonal cellular platform where six, or a multiple of six, frequency groups are directionalized and reused in the same direction. Directional antennas are located in the center of each cell. Each antenna radiates into a 60° sector of the cell. The reused frequency groups are aligned along the 0°, 120°, and 240° axes of each cell. Each axis has three layers, the two outer layers having an identical frequency reuse series. The frequency groups are reused in the same direction along each axis, reducing the number of dominant interfering cells to one.

9 Claims, 4 Drawing Sheets

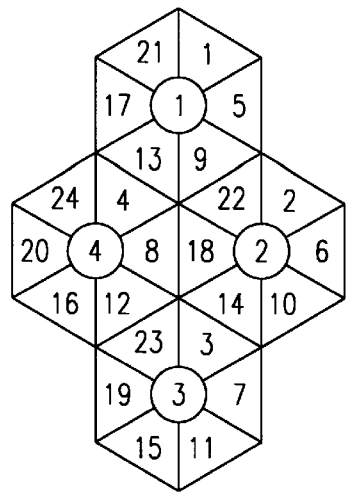
*FIG. 1*
*(PRIOR ART)*
*FIG. 2*
*(PRIOR ART)*
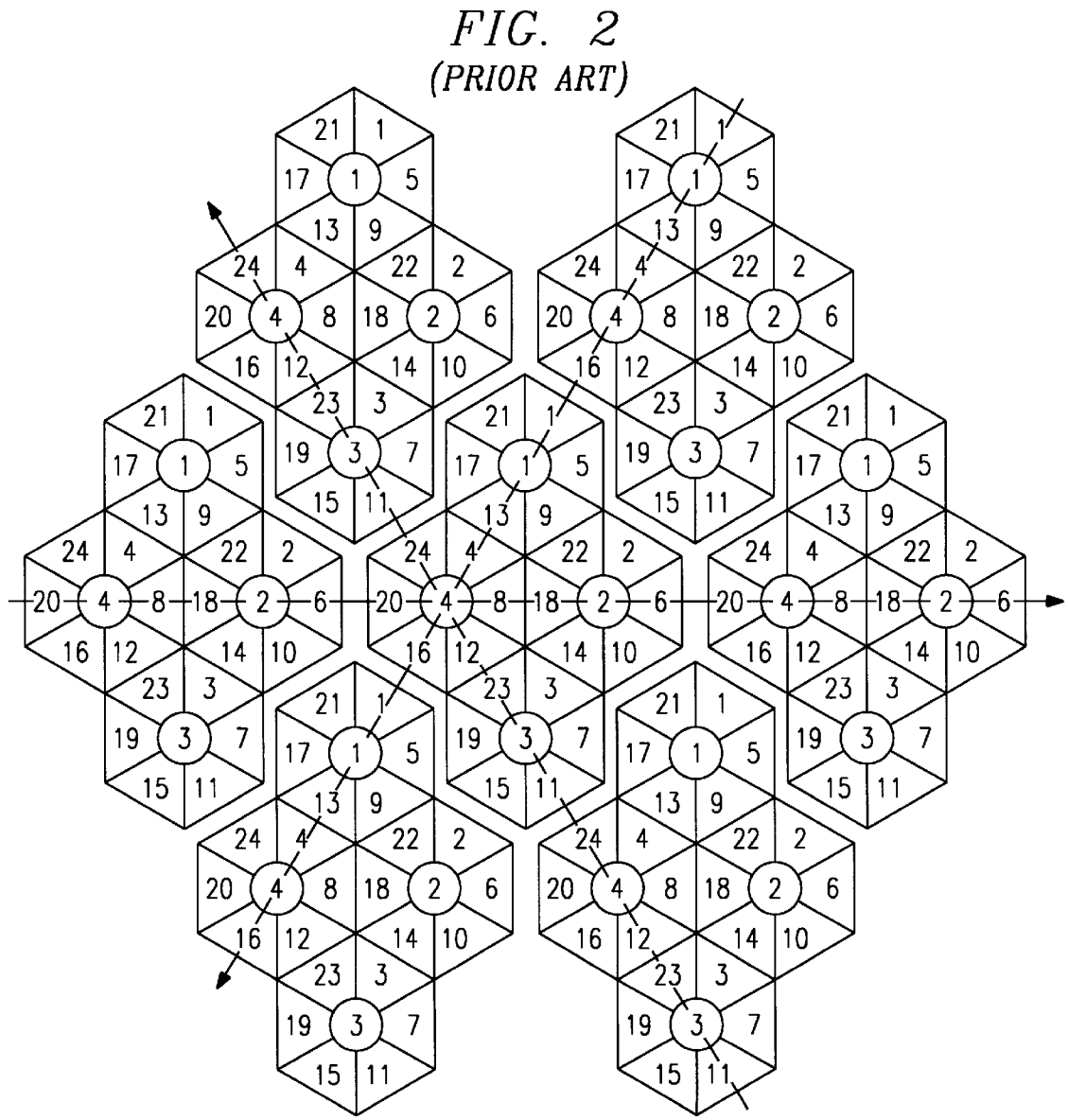

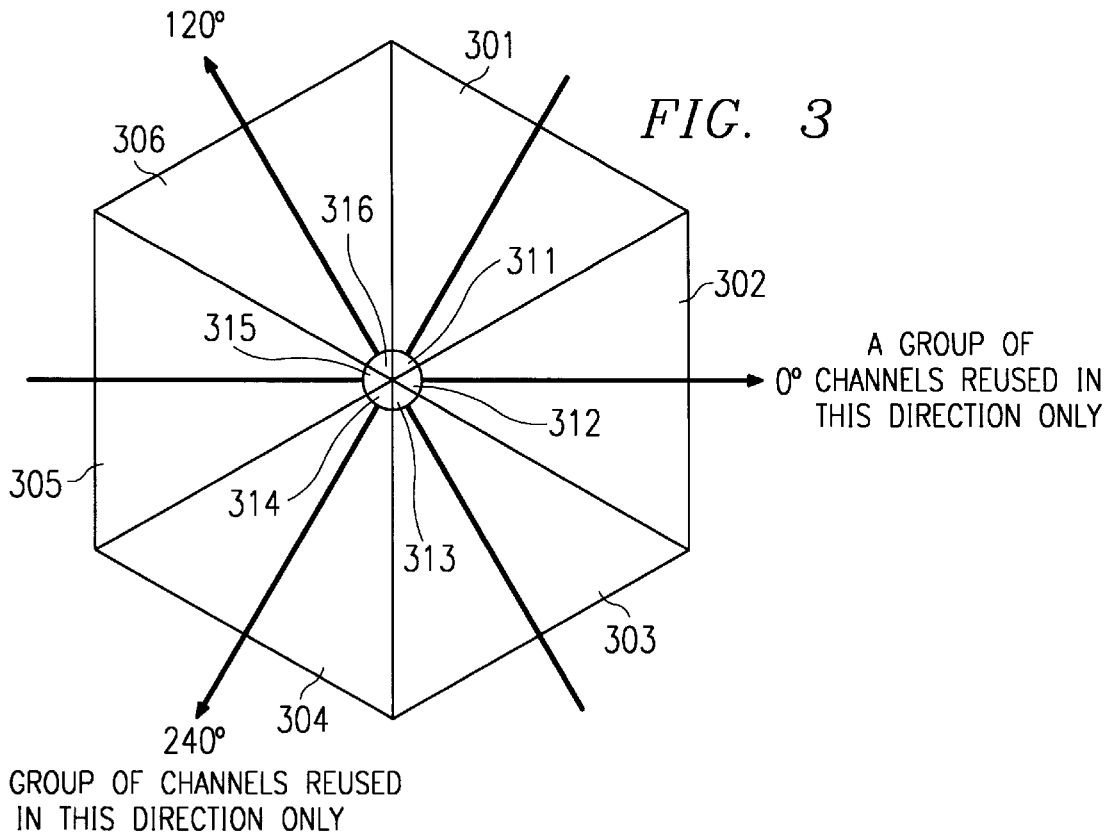
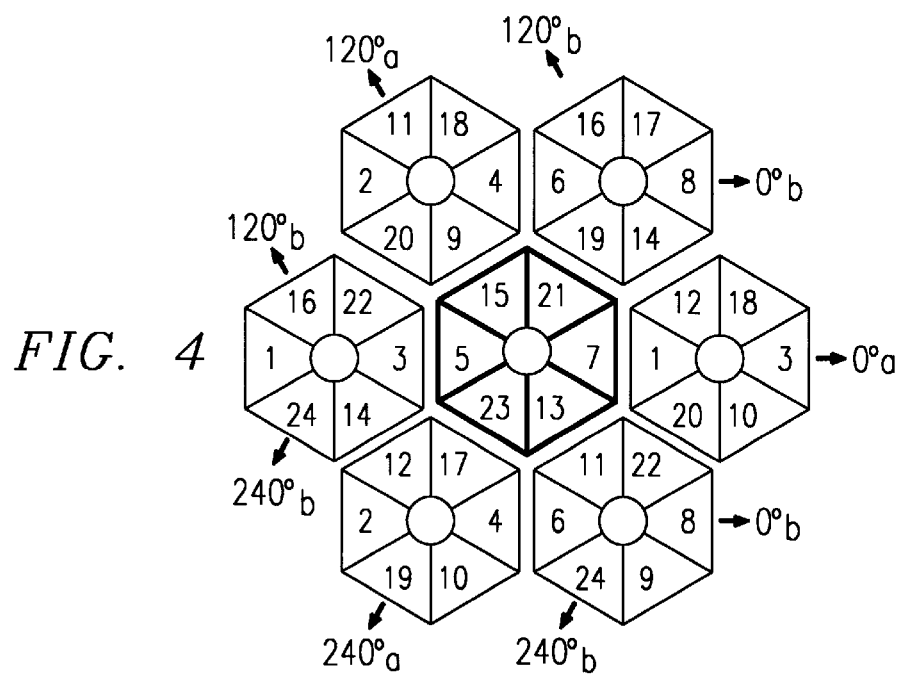

DIRECTIONAL FREQUENCY ASSIGNMENT IN A CELLULAR RADIO SYSTEM

BACKGROUND OF THE INVENTION

1. Field of the Invention

The present invention relates to radio communications. More particularly, the present invention relates to cellular radiotelephone communications.

2. Description of the Related Art

Cellular radiotelephone systems enable mobile subscribers to communicate with land-line telephone networks while moving through a geographical area. High density, high capacity cells in typical cellular radiotelephone systems are made up of six directional antennas centrally located in the cell. Each antenna radiates into a 60° sector of the cell. A number of these cells are combined to form the cellular radiotelephone system.

The cell shapes are determined by both the radiation pattern of the antennas and the local conditions at the cell site. Cells, however, are typically idealized as hexagonal patterns since such a pattern closely approximates the ideal antenna radiation pattern.

Cellular radiotelephone systems use different channel frequencies for each mobile subscriber. The transmission from the mobile to the cell uses one frequency while the transmission from the cell to the mobile user uses another frequency. These two frequencies are not used by other nearby mobiles as this would lead to interference on the channel and a reduction in signal quality. This interference is referred to in the art as co-channel interference.

Another type of interference experienced by mobile subscribers is adjacent channel interference. This interference is due to the energy slipover between adjacent channels.

Both types of interference affect the signal quality, referred to as the carrier to interference ratio (C/I). This ratio is the signal strength of the received desired carrier to the signal strength of the received interfering carriers. A number of physical factors can also affect C/I in cellular systems including: buildings, geography, antenna radiation patterns, mobile traffic transmitting power, and mobile traffic location within the cell.

Due to the low power of the cell's transmitters, the same frequencies can be reused in other cells, referred to as co-channel cells, in the same geographical area. Greater frequency reuse allows more mobile traffic to use the cellular system. There are, however, constraints on the location of the co-channel cells. Even though the transmitters are typically low power, placing co-channel cells too close may cause interference.

Frequency planning optimizes spectrum usage, enhances channel capacity and reduces interference. A frequency plan also ensures adequate channel isolation to avoid energy slipover between channels, so that adjacent channel interference is reduced. Moreover, an adequate repeat distance is provided to an extent where co-channel interference is acceptable while maintaining a high channel capacity. In order to accomplish these diverse requirements, a compromise is generally made so that the target C/I performance is acquired without jeopardizing the system capacity. However, the existing frequency planning schemes do not always permit this. As a result, with growing cellular subscribers, today's cellular networks are overloaded and do not provide an adequate service.

A prior art method of symmetrical frequency planning begins with two integers, i and j, that are referred to as shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise.

After all the possible co-channel cells of the initial cell are laid out, another reference cell is chosen and the procedure is repeated. This entire procedure is repeated as often as necessary to establish the frequency plan of the entire metropolitan cellular system.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to cellular radiotelephones. A low number of cells in a reuse pattern means more channel groups can be formed and more users accommodated.

Another method for determining frequency reuse is illustrated in FIGS. 1 and 2. FIG. 1 illustrates a conventional N=4, 60° sectorized cell cluster. This system is based on dividing the available channels into 24 frequency groups that are distributed evenly among four 60° cell sites (a cluster). One frequency group is allocated per sector.

FIG. 2 illustrates a growth plan using the cluster of FIG. 1. Each cluster is repeated throughout the network. As a result, there are at least five co-channel sites that are randomly oriented. The C/I performance, therefore, is due to the five randomly oriented co-channel interferers.

The reuse distance of this plan is $D/R=\sqrt{4\times 3}=3.46$. From the reuse distance, the C/I prediction equation, well known in the art, is estimated as:

$$\frac{C}{I} \approx 10\log\left[\frac{1}{5}\left(\frac{D}{R}\right)^{\gamma}\right] + \Delta dB(avg.)$$

where $\gamma$ is the pathloss slope and $\Delta dB$ is due to the antenna directivity. The antenna directivity is typically 3–5 dB, depending on the antenna beamwidth.

The pathloss slope, also referred to in the art as the propagation constant, is well known in the art. This constant is the rate of decay of signal strength as a function of distance. The pathloss slope increases as the environment surrounding the cells becomes more crowded with buildings and other obstructions. These values range from 2 for free space with no obstructions, 2.5 for rural areas, 3–3.5 for suburban areas, 3.5–4 for urban areas, and 4–4.5 for dense urban areas.

In the above example, $\Delta dB$ is conservatively estimated at 5 dB. In this case, $C/I\approx 19.6$ dB. Additional measures, such as antenna downtilt and beamwidth, have to be properly engineered for satisfactory performance and operation of this system.

In the Advanced Mobile Phone System (AMPS) used in North America, 416 frequencies are available for cellular use. These 416 frequencies must be divided among the cells and reused as necessary to provide coverage to a metropolitan or other geographical area. Additionally, 21 of these channel frequencies must be used as control frequencies to establish calls between users and cells. This further reduces the number of channels to 395 for use as voice channels.

In the above N=4 system, the number of voice channels per sector is $395/24\approx 16$. This results in $16\times 6=96$ voice channels per cell.

There is still a need for even greater frequency reuse to expand the capacity of the cellular system without performance degradation. There is an additional need for an economical method of frequency reuse.

SUMMARY OF THE PRESENT INVENTION

The present invention encompasses frequency allocation in a cellular radio system. The available frequencies are grouped into a predetermined number of frequency groups. In the preferred embodiment, the frequencies are grouped into six or a multiple of six frequency groups.

An antenna array comprised of directional antennas is positioned relatively close to the center of each hexagonal cell. Each antenna radiates into a predetermined sector of the cell. In the preferred embodiment, the sector is a 60° radiation pattern.

The cells are formed into a cluster of seven cells, each cluster has a plurality of frequency reuse axes. Each frequency reuse axis has a plurality of layers.

A first series of the frequency groups is allocated to the sectors along a first frequency reuse axis. In the preferred embodiment, this series is comprised of sequentially odd numbered groups.

A second series of the frequency groups is allocated to the sectors along a second and a third frequency reuse axis. In the preferred embodiment, this series is comprised of sequentially even numbered groups.

This allocation of frequency groups is repeated for the other axes of the cellular cluster. In the preferred embodiment, the cellular cluster has three frequency reuse axes and three layers to each axis. The outer two layers are identical. The end result of this process is a reuse pattern that repeats itself along the respective direction of the antenna.

BRIEF DESCRIPTION OF THE DRAWINGS

FIG. 1 shows a cell cluster utilizing a typical prior art sectorized frequency plan.

FIG. 2 shows the prior art growth plan using the concept of FIG. 1.

FIG. 3 shows the principle of directional frequency reuse based on a six sector, hexagonal cell.

FIG. 4 shows a cluster of sectorized cells illustrating an N=4 directional frequency reuse layout.

DETAILED DESCRIPTION OF THE PREFERRED EMBODIMENT

Figure 5:
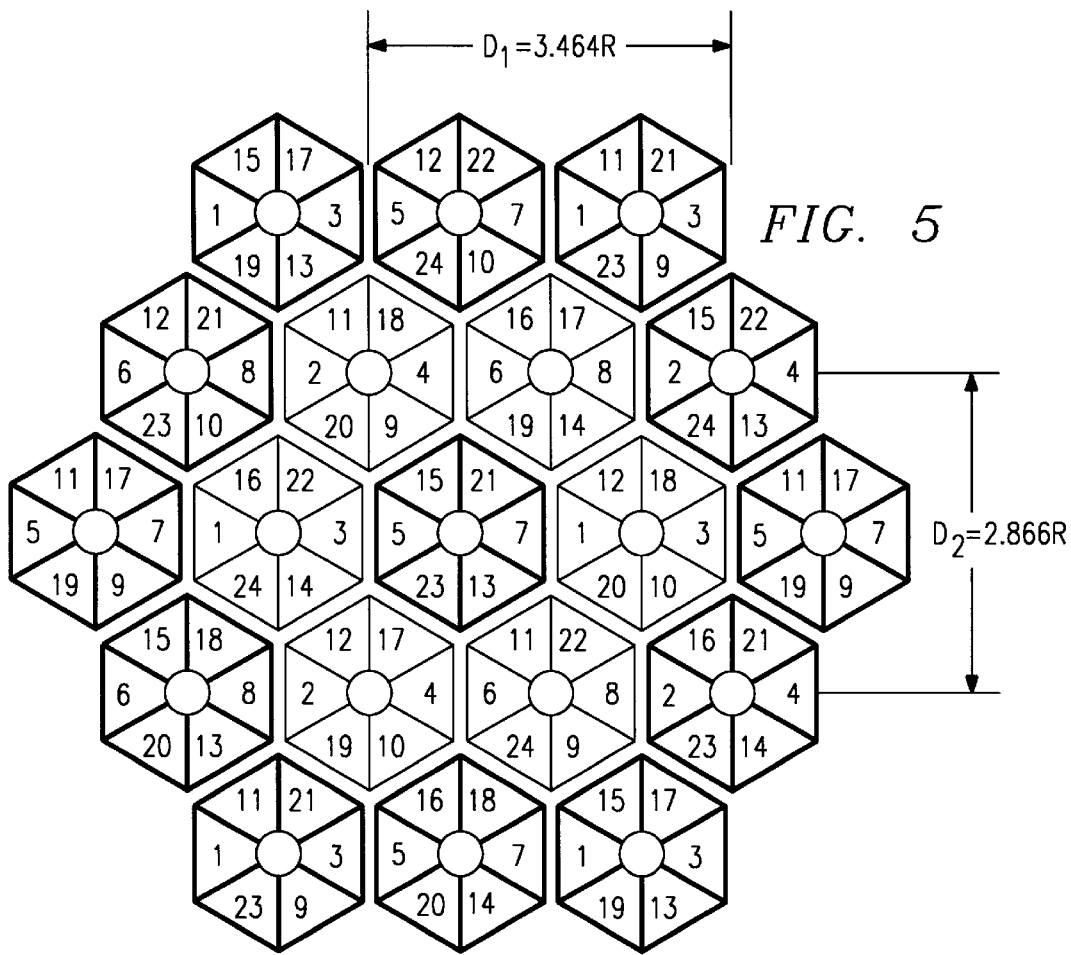
FIG. 5 shows a frequency reuse growth plan using the cluster of FIG. 4.

The directional frequency allocation plan of the present invention exploits the antenna front-to-back ratio to yield additional C/I margin and provide greater frequency reuse, thereby increasing user capacity. In this process, a group of channels is reused in the same direction that the antenna is pointing, thus fully exploiting the antenna front-to-back ratio. As a result, the number of dominant interfering cells are reduced to one, thereby enhancing C/I.

The frequency plan of the present invention is based on a hexagonal cellular platform, illustrated in FIG. 3, that is comprised of six identical sectors (301–306). The sectors (301–306) are driven by directional antennas (311–316) in the center of the cell. Each antenna (311–316) radiates into a 60° sector of the cell. Since the hexagons are only an ideal representation of the cell structure, the antennas may not be implemented exactly in the center of the group but may be offset somewhat due to geography, buildings, or cell requirements.

The worst case interference is due to only one interfering cell along the same axis. The three axes of reuse, as seen in FIG. 3, are subsequently referred to as $\{f(0°)\}$, $\{f(120°)\}$, and $\{f(240°)\}$.

As is well known in the art, the antennas (311–316) are coupled to transceivers. The transceivers are coupled to the public switched telephone network through switches.

The principle of directional reuse illustrated in FIG. 3 is expanded in FIG. 4. FIG. 4 illustrates using seven of the hexagonal cellular platforms to form a cellular cluster. In this embodiment, each of the three axes are comprised of three parallel layers. The two outer b layers are identical. The a and b layers are designated as:

$$\{f(0°)\}_a$$

$$\{f(0°)\}_b \text{ along the } 0° \text{ axis} \quad (1)$$

$$\{f(120°)\}_a$$

$$\{f(120°)\}_b \text{ along the } 120° \text{ axis} \quad (2)$$

$$\{f(240°)\}_a$$

$$\{f(240°)\}_b \text{ along the } 240° \text{ axis} \quad (3)$$

The directional frequency assignment of the present invention results in a total of six or multiples of six frequency groups. According to the preferred embodiment, a frequency group is reused only in each direction. Therefore, the available 395 voice channels are divided up into six or a multiple of six frequency groups. These groups are then directionalized and distributed among the cellular groups as subsequently discussed.

FIG. 4 illustrates the preferred embodiment that is based on an N=4 cellular system having 24 frequency groups (N=24 frequency groups/6 sectors per cell). The frequency groups are numbered consecutively 1, 2, . . . , 24. In this embodiment, these frequency groups are directionalized along each axis and reused according to the following principle:

$$\{f(0°)\}_a = 1, 3, 5, 7, 1, \ldots$$

$$\{f(0°)\}_b = 2, 4, 6, 8, 2, \ldots \text{ Direction}=0° \quad (4)$$

$$\{f(120°)\}_a = 9, 11, 13, 15, 9, \ldots$$

$$\{f(120°)\}_b = 10, 12, 14, 16, 10, \ldots \text{ Direction}=120° \quad (5)$$

$$\{f(240°)\}_a = 17, 19, 21, 23, 17, \ldots$$

$$\{f(240°)\}_b = 18, 20, 22, 24, 18, \ldots \text{ Direction}=240° \quad (6)$$

A cellular cluster, comprised of seven hexagonal cell groups and using the above channel distribution pattern, is illustrated in FIG. 4. These cellular clusters are reused consistently throughout the geographical service area. The number in each sector represents the frequency group assigned to that sector. As can be seen, frequency reuse within the cluster exploits antenna front-to-front and side-to-side ratio throughout the service area. Adjacent channel interference is thereby reduced.

The growth plan, incorporating the cluster of FIG. 4, is illustrated in FIG. 5. This growth plan exhibits two different reuse distances: $D_1=3.464$ R and $D_2=2.866$ R. $D_1$ is due to a reuse site at 180° out of phase while $D_2$ is due to two reuse sites located at 90° out of phase. The reuse distances translate into a reuse plan of N=4.

In the preferred embodiment, there is only one dominant interferer, with two side interferers. The C/I prediction equation is estimated as:

$$\frac{C}{I} = 10\log\frac{1}{(D_1/R)^\gamma + \frac{1}{2}(D_2/R)^\gamma} + \Delta dB(avg.) \quad (7)$$

where $D_1/R=3.464$, $D_2/R=2.866$, $\gamma$ is the pathloss slope, and $\Delta dB=5$ dB (typical).

In the preferred embodiment of the present invention, C/I≈23.43 dB in an urban ($\gamma=4$) environment. Other environments with different pathloss slopes will have different C/I values.

The corresponding theoretical subscriber capacity for the preferred embodiment is approximately 395/24≈16 voice channels per sector and 16×6=96 voice channels per cell. Alternate embodiments that use other multiples of six frequency groups have different quantities of voice channels assigned to each frequency group.

The standard Grade of Service (GOS) for AMPS is 2% and is well known in the art. This means that it is acceptable for 2% of the calls in a cellular service provider's area to be blocked by some means such as buildings or terrain. Using this GOS, the preferred embodiment of the present invention provides 9.83 erlang per sector, as determined from the standard cellular traffic table well known in the art. Since there are six sectors per cell, the present invention provides 9.83×6=58.98 erl. per cell.

Figure 6:
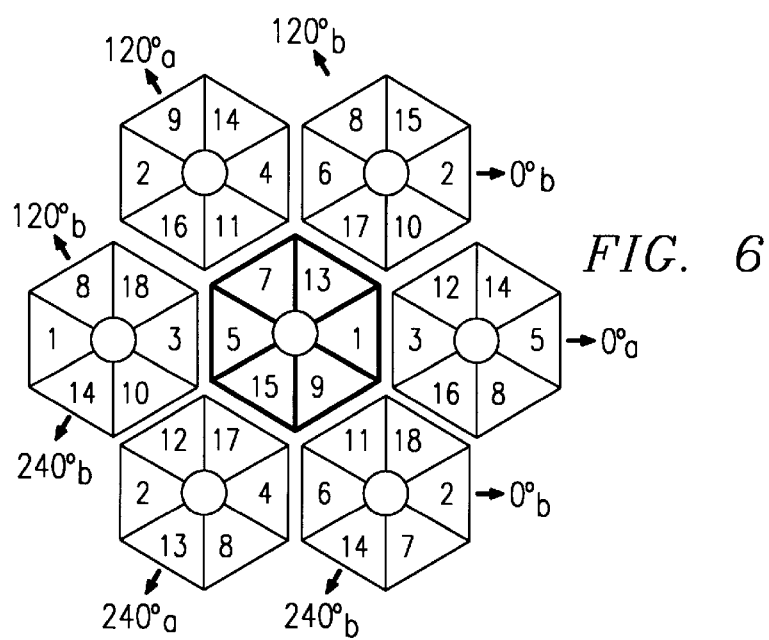
FIG. 6 shows a cluster of sectorized cells illustrating an N=3 directional frequency reuse layout.

FIG. 6 illustrates an alternate embodiment of the present invention based on 18 or multiples of 18 frequency groups. This is accomplished using a process similar to the preferred embodiment wherein the hexagonal cells are grouped into seven cell clusters.

In the N=3 embodiment of FIG. 6, the 18 channel groups are directionalized as:

$$\{f(0°)\}_a = 1, 3, 5, 1, \ldots$$

$$\{f(0°)\}_b = 2, 4, 6, 2, \ldots \quad (8)$$

$$\{f(120°)\}_a = 7, 9, 11, 7, \ldots$$

$$\{f(120°)\}_b = 8, 10, 12, 8, \ldots \quad (9)$$

$$\{f(240°)\}_a = 13, 15, 17, 13, \ldots$$

$$\{f(240°)\}_b = 14, 16, 18, 14, \ldots \quad (10)$$

The N=3 directional frequency reuse plan shown in FIG. 6, where each reuse frequency uses the antenna front-to-back ratio, is consistent throughout the service area. As in the preferred embodiment, the number in each sector represents the frequency group assigned to that sector.

Figure 7:
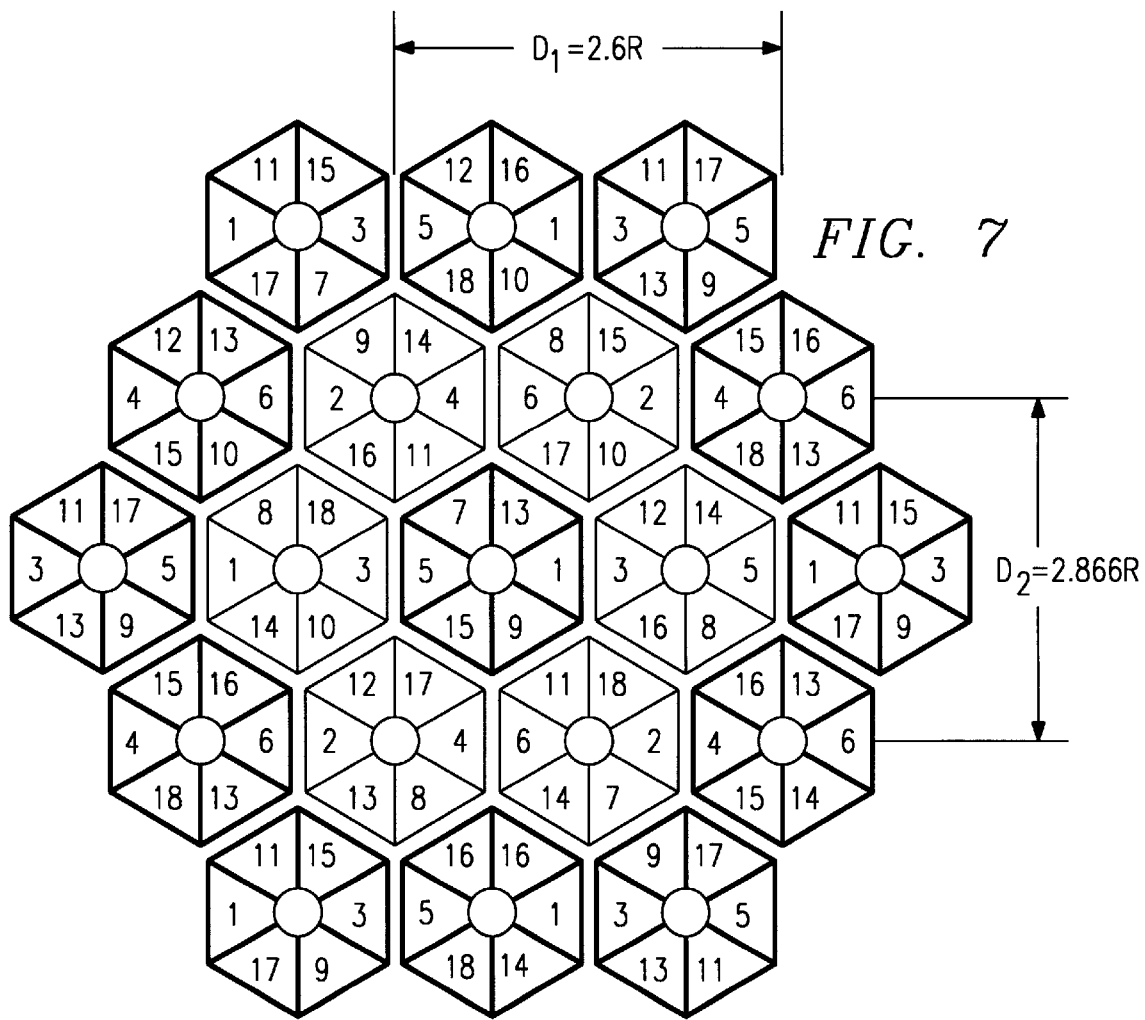
FIG. 7 shows a frequency reuse growth plan using the cluster of FIG. 6.

The plan of FIG. 6 is incorporated into a growth plan illustrated in FIG. 7. This growth plan exhibits two different reuse distances: $D_1=2.64$ R and $D_2=2.866$ R. $D_1$ is due to a reuse site at 180° out of phase and $D_2$ is due to two reuse sites at 90° out of phase.

The C/I due to the one dominant interferer that is pointing directly at the reused site (i.e., at 180° out of phase) can be estimated as:

$$\frac{C}{I} = 10\log\frac{1}{(D_1/R)^\gamma + \frac{1}{2}(D_2/R)^\gamma} + \Delta dB(avg.) \quad (11)$$

where $D_1/R=2.464$, $D_2/R=2.866$, $\gamma=4$ (urban environment), and $\Delta dB=5$ dB (typical). In this case, C/I≈19.6 dB.

This C/I is exactly the same as the prior art N=4, 60° plan. However, this embodiment of the present invention provides a channel capacity of 395/18≈22 voice channels per sector and 22×6=132 voice channels per cell. At 2% GOS, this translates into 14.9 erl. per sector and 14.9×6=89.4 erl. per cell. Therefore, this N=3 directional frequency plan provides greater capacity, compared to the prior art N=4 plan, without loss of performance.

In summary, the directional frequency allocation plans of the present invention fully exploit the antenna front-to-back ratio and provide greater cellular system capacity than the prior art without loss of performance. Additional benefits include trunking efficiency, reduced hardware and software complexities, and reduced cost of implementation.

I claim:

1. A method for frequency allocation in a cellular system, the cellular system having a plurality of available frequencies and comprising a plurality of cells, each cell comprising six sectors, the method comprising the steps of:

forming a cluster of cells comprising a subset of the plurality of cells, the cluster of cells having a plurality of frequency reuse axes, each frequency reuse axis having a plurality of layers, each layer on a first frequency reuse axis of the plurality of frequency reuse axes being parallel to the other layers on the first frequency reuse axis;

grouping the plurality of available frequencies into a plurality of frequency groups;

assigning a first series of the frequency groups to the sectors on a first layer of the plurality of layers along the first frequency reuse axis of the plurality of frequency reuse axes, the first series being composed only of odd numbered frequency groups; and assigning a second series of the frequency groups, the second series being composed only of even numbered frequency groups, to the sectors on a second and third layer of the plurality of layers along the first frequency reuse axis of the plurality of frequency reuse axes, the second and third layers each being adjacent the first layer.

2. The method of claim 1 and further including the step of repeating the cellular cluster to cover a geographical region, comprises a predetermined number of even numbered frequency groups.

3. The method of claim 2 wherein the cellular system has a first frequency reuse distance in a first direction and a second frequency reuse distance in a second direction.

4. The method of claim 1 wherein the predetermined number of frequency groups is equal to a multiple of 6.

5. The method of claim 1 wherein the second and third frequency layers are on either side of the first layer.

6. A method for frequency allocation in a cellular system, the cellular system having a plurality of available frequencies and comprising a plurality of cells, each cell comprising six sectors and a plurality of directional antennas, each antenna radiating into a sector of the cell, the method comprising the steps of:

forming a cellular cluster from seven of the cells, the cellular cluster having a plurality of frequency reuse axes, each frequency reuse axis comprising a plurality of layers parallel to each other, the cellular cluster comprising a center cell and six surrounding cells;

grouping the plurality of available frequencies into a predetermined number of frequency groups, the frequency groups being numbered in a sequential manner;

allocating a first series of odd numbered frequency groups along a first layer of a first frequency reuse axis;

allocating a second series of even numbered frequency groups along a second and a third layer of the first frequency reuse axis;

allocating a third series of odd numbered frequency groups along a first layer of a second frequency reuse axis;

allocating a fourth series of even numbered frequency groups along a second and third layer of the second frequency reuse axis;

allocating a fifth series of odd numbered frequency groups along a first layer of a third frequency reuse axis; and allocating a sixth series of even numbered frequency groups along a second and third layer of the third frequency reuse axis.

7. The method of claim 6 and further including the step of repeating the cellular cluster to cover a geographical area.

8. The method of claim 6 wherein the predetermined number of frequency groups is equal to a multiple of 6.

9. The method of claim 6 wherein the steps of allocating include allocating the frequencies in such a manner so as to create a first reuse distance in a first direction and a second reuse distance in a second direction.

* * * * *